United States Patent
Coners et al.

(10) Patent No.: US 10,676,326 B2
(45) Date of Patent: Jun. 9, 2020

(54) METHOD FOR INSTALLING A ROTOR BLADE ON A WIND TURBINE

(71) Applicant: WOBBEN PROPERTIES GMBH, Aurich (DE)

(72) Inventors: Rolf Coners, Elisabethfehn (DE); Fiona Laoda, Aurich (DE)

(73) Assignee: Wobben Properties GmbH, Aurich (DE)

( * ) Notice: Subject to any disclaimer, the term of this patent is extended or adjusted under 35 U.S.C. 154(b) by 328 days.

(21) Appl. No.: 15/502,972

(22) PCT Filed: Aug. 3, 2015

(86) PCT No.: PCT/EP2015/067843
§ 371 (c)(1),
(2) Date: Feb. 9, 2017

(87) PCT Pub. No.: WO2016/023781
PCT Pub. Date: Feb. 18, 2016

(65) Prior Publication Data
US 2017/0233228 A1 Aug. 17, 2017

(30) Foreign Application Priority Data
Aug. 12, 2014 (DE) .......... 10 2014 215 969

(51) Int. Cl.
*B66C 13/04* (2006.01)
*B66C 13/46* (2006.01)
(Continued)

(52) U.S. Cl.
CPC .............. *B66C 13/04* (2013.01); *B66C 13/44* (2013.01); *B66C 13/46* (2013.01); *B66C 13/48* (2013.01);
(Continued)

(58) Field of Classification Search
CPC ....... B66C 13/04; B66C 23/185; B66C 13/44; B66C 13/48; B66C 13/46; F03D 17/00; F03D 1/0658; F03D 13/10; Y02E 10/721; Y02P 70/523; F05B 2270/32; F05B 2270/303; F05B 2230/61; F05B 2270/321
See application file for complete search history.

(56) References Cited

U.S. PATENT DOCUMENTS 7,207,777 B2 4/2007 Bervang
8,490,749 B2 7/2013 Teichert
(Continued)

FOREIGN PATENT DOCUMENTS

CN 2273306 Y 1/1998
CN 101375008 A 2/2009
(Continued)

*Primary Examiner* — Ryan J. Walters
(74) *Attorney, Agent, or Firm* — Seed Intellectual Property Law Group LLP (57) ABSTRACT

A method for installing a rotor blade on a wind turbine, the rotor blade comprising a blade root for fastening the rotor blade to a hub, a blade tip facing away from the blade root, and a longitudinal axis running from the blade root to the blade tip, and the method comprising the steps of: hoisting the rotor blade using a crane, recording measurement data relating to the position and/or orientation of the rotor blade using at least one measuring means during the hoisting, and transmitting the measurement data to at least one monitoring station for monitoring the hoisting and/or to at least one control facility for controlling the position and/or orientation of the rotor blade.

10 Claims, 3 Drawing Sheets

(51) Int. Cl.
  *B66C 13/48* (2006.01)
  *F03D 13/10* (2016.01)
  *F03D 17/00* (2016.01)
  *B66C 13/44* (2006.01)
  *B66C 23/18* (2006.01)
  *F03D 1/06* (2006.01)

(52) U.S. Cl.
  CPC .......... *B66C 23/185* (2013.01); *F03D 1/0658* (2013.01); *F03D 13/10* (2016.05); *F03D 17/00* (2016.05); *F05B 2230/61* (2013.01); *F05B 2270/303* (2013.01); *F05B 2270/32* (2013.01); *F05B 2270/321* (2013.01); *Y02E 10/721* (2013.01); *Y02P 70/523* (2015.11)

(56) References Cited

U.S. PATENT DOCUMENTS

2011/0260126 A1* 10/2011 Willis .................... B63B 27/08
   254/283
2012/0228881 A1    9/2012 Siegfriedsen
2012/0328408 A1* 12/2012 Sorensen ............. B66C 23/185
   414/816
2015/0158704 A1    6/2015 Giles et al.
2015/0183517 A1*  7/2015 Jensen .................. B64C 39/022
   244/76 R

FOREIGN PATENT DOCUMENTS

| | | |
|---|---|---|
| CN | 102639870 A | 8/2012 |
| CN | 203037247 U | 7/2013 |
| DE | 102009056245 A1 | 6/2011 |
| EP | 2738133 A1 | 6/2014 |
| JP | H05-186189 A | 7/1993 |
| JP | H09257904 A | 10/1997 |
| JP | 2012-188213 A | 10/2012 |
| WO | 03100249 A1 | 12/2003 |
| WO | 2011137937 A2 | 11/2011 |
| WO | 2014027201 A1 | 2/2014 |

\* cited by examiner

METHOD FOR INSTALLING A ROTOR BLADE ON A WIND TURBINE

BACKGROUND

Technical Field

The present invention relates to a method for installing components, in particular a rotor blade, on a wind turbine.

Description of the Related Art

In the case of a horizontal installation of a rotor blade, which is discussed here, the rotor blade is prepared on the ground at the installation site. This of course also includes a preparation for example on a low-loader. This includes fastening the rotor blade to a crane rope. In addition, further guide ropes can be fastened to the rotor blade in order to guide the rotor blade or at least act on the rotor blade in a guiding manner.

The rotor blade is then hoisted using the crane and guided into its horizontal position with its blade root against the hub, such that it can be received and screwed there.

For this purpose the crane operator hoists the blade in a known manner and then moves it to the correct height and moves it towards the hub. As a result of the guide rope it is, in simplified terms, ensured that the rotor blade also points with its blade root towards the hub. Where necessary, a rotor blade traverse may be provided in addition, which for example makes it possible to rotate the rotor blade about its longitudinal axis.

In this respect a comparatively large amount of manual labor is also necessary in this case. The crane is usually operated manually, wherein commands or communication may be provided for this purpose via radio equipment or the like. The fastening and prior receiving of the rotor blade on the hub are manually coordinated and implemented. Manual implementation does not mean that no machines or tools are used. The situation is similar with use of guide ropes that can be actuated from the ground by winches.

Here, it must be noted that such a rotor blade nowadays may weigh a number of tons. The length of a modern rotor blade lies in the range of 50 meters and above. Hub heights nowadays also are often far above 100 meters and for example may also reach 150 meters.

The coordination of these processes is carried out on the basis of the position and orientation of the rotor blade fundamentally visually. An experienced assembly worker recognizes the height and orientation of the rotor blade and controls the lifting and orientating accordingly. When accurately positioning the root blade relative to the hub, service staff located at the blade hub can make themselves noticeable by hand signs or by radio equipment and can give the crane operator or the assembly worker on the ground corresponding signs or instructions by radio.

It is problematic here that such an assembly requires good weather. Such assembly is not currently possible during a storm or with poor visibility conditions. Here, it must be noted that even moderate fog may mean that target hubs and therefore installation heights from 100 to 150 meters can make it impossible to identify the rotor blade, let alone the orientation thereof. As a result, this also includes lower-lying cloud, particularly in the case of installations in higher areas.

Similar problems are encountered during a storm, but even with low wind speeds. Even if the wind were weak enough in principle to allow installation of the rotor blade in that said rotor blade is held sufficiently strongly by pulling winches arranged at ground level for example, the strong variation of the wind considerably hinders such an installation process as the height increases. Here, it must be noted that the wind speed on the ground, even at a height of a few meters, is much lower than at 100 or 150 meters above the ground.

As a result, such blade installations are then only performed when good weather conditions prevail accordingly. Particularly in areas with strong wind and a lot of fog or rain, which also may impair visibility, it is increasingly more difficult to encounter weather conditions sufficient for the installation of a rotor blade or other components. Accordingly, the blade installation is then prepared as well as possible, such that it can be performed as quickly as possible as soon as the weather conditions allow.

Such an installation under time pressure naturally may be problematic for safety and in addition may also be problematic for the quality of the installation, i.e., for damage-free installation.

In the priority application relating to the present application, the German Patent and Trade Mark Office researched the following prior art: DE 10 2009 056 245 A1.

BRIEF SUMMARY

A solution is proposed that enables a rotor blade to be installed in less favourable weather conditions than before.

The present invention relates to a method for installing components, in particular a rotor blade, on a wind turbine. The invention also relates to an installation arrangement for installing components, in particular a rotor blade, on a wind turbine. In addition, the invention relates to a transducer for use in a method and/or in an installation arrangement for installing components, in particular a rotor blade, on a wind turbine. The invention also relates to a satellite-assisted location and position display.

The invention in particular relates to a horizontal axis wind turbine, in which a rotor having a rotor blade, usually three rotor blades, rotates about a substantially horizontal axis. Here, the rotor blades are fastened to a corresponding hub. A possibility for erecting a wind turbine lies in installing the rotor hub and rotor blades separately, specifically one after the other. Each rotor blade is thus then fixed to the hub, which is already installed or preliminarily installed. The method thus can also be applied for the exchange of blades, including the uninstalling of blades. However, other components, particularly heavy components weighing more than a ton, such as a generator, a nacelle, a main frame or a hub, may also be installed. The installation on a wind turbine in this respect relates to the installation on a wind turbine that has been constructed apart from the corresponding component to be installed.

A method will be described hereinafter in particular on the basis of the example of a rotor blade. The method steps and necessary installation means, however, can also be applied analogously to the installation of other components. These include the generator, the nacelle, the hub specifically the rotor hub, to which the rotor blades are fastened, and the main frame. The component, which may also be a rotor blade, is thus installed on the wind turbine if the wind turbine has already been constructed. In any case, the component is installed on a partially constructed wind turbine, which at least has a constructed tower, and the component is installed on the tower or above the tower. The installation also includes the mounting, and the invention therefore relates equally to the mounting. Any claims, embodiments and explanations relating to the installation are also claims, embodiments and explanations relating to the mounting.

The proposed method is based on a wind turbine that, as soon as it is fully constructed, has at least one rotor blade. Such a rotor blade has a blade root for fastening to the hub, i.e., the rotor hub, and a blade tip, i.e., a rotor blade tip, and a longitudinal axis between the blade root and blade tip. Other components also have longitudinal axes that can be fixed for orientation. For the generator, the nacelle, the hub, and also the main frame, the axis of rotation of the generator is preferably selected as the longitudinal axis. For components other than the rotor blades, a front fastening point and a rear fastening point may be provided at the location of the blade root and blade tip respectively.

The following method steps are now proposed for the described rotor blade. The rotor blade is first hoisted using a crane. Whilst being hoisted, measurement data relating to the position and additionally or alternatively to the orientation of the rotor blade is recorded. At least one measuring means is provided for this purpose. The measurement data is then transmitted to a monitoring station or control facility.

The monitoring station by way of example may convert the obtained measurement data into a visualization, which displays the location and position of the rotor blade on a display.

The control facility may initiate and perform control actions automatically from this measurement data. If, by way of example, it is measured that the blade root of the rotor blade is not pointing towards the rotor hub, to which the blade is to be fastened, a corresponding actuator can counteract this directly, which will also be further explained hereinafter on the basis of details.

It is therefore proposed here are to replace or supplement the visual orientating and positioning of the rotor blades with the recording of measurement values that contain information necessary for the orientating and positioning.

As a result, it is at least possible to now also orientate a rotor blade or other component to be installed, fundamentally suspended on the crane at dizzying height, without visual contact. The rotor blade thus can be installed with poor visibility. Hereby, an installation of the rotor blade in the dark can also be improved or enabled.

In order to record at least some of the measurement data, a transducer is preferably arranged on the rotor blade or is arranged on the component of the wind turbine to be installed. This transducer records at least one of the following variables:

a height position of the rotor blade or of the other component to be installed,
  an inclination of the longitudinal axis of the rotor blade or of the other component to be installed,
  an orientation of the longitudinal axis in a horizontal plane,
  a rotary position of the rotor blade or of the other component to be installed about the longitudinal axis,
  temperature, in particular specifically ambient temperature
  the wind speed or wind strength in the region of the transducer, and
  the wind direction in the region of the transducer.

The transducer thus may record values from one or more measuring means and transmit these values for example to an evaluation apparatus, such as a control facility or display apparatus. The transducer preferably comprises measuring means. Measuring means may include a measuring sensor or one or more measuring sensors.

The transducer in particular may be arranged on the rotor blade approximately centrally both in the longitudinal and in the transverse orientation. Or, it may be arranged approximately in the region of the center of gravity of the rotor blade or other component to be installed, more specifically preferably in the region of the fastening to the crane. With use of a rotor blade traverse or other traverse, i.e., when the rotor blade is carried by means of a rotor blade traverse, the transducer may also be fastened to the rotor blade traverse or other traverse. The measuring means of the transducer or at least some of said measuring means is/are preferably also arranged there.

With the aid of the measurement data recorded there, the position and orientation of the rotor blade or of another component to be installed can be established directly at or at least in the vicinity of the rotor blade. The detection of the height position of the rotor blade makes it possible to determine the position of said rotor blade, and in particular to transmit this to the crane or crane operator. At the same time it can be transmitted to a central control system and additionally or alternatively to a manager, who coordinates the process of the installation of the rotor blade. For this purpose, a pressure sensor for example may be used as a measuring means, which pressure sensor can determine the height via the air pressure or the air pressure drop. Other variants such as a radio measurement to the ground are also considered.

The detection of an inclination of the longitudinal axis of the rotor blade or other component makes it possible to identify an inclination relative to a horizontal orientation and to take countermeasures where necessary. The detection of the orientation of the longitudinal axis of the rotor blade and therefore of the rotor blade as such in the horizontal plane in particular also makes it possible to orientate the blade root towards the hub to which the blade root is to be fastened. Alternatively, fastening flanges of other components to be installed are orientated relative to corresponding flanges on which the component is to be installed. This orientation of the longitudinal axis in a horizontal plane thus relates to the orientation in the sense of one of the compass directions or an orientation there between. An orientation of the longitudinal axis in a horizontal plane is also to be understood to mean an orientation in the sense of the four compass directions, without the longitudinal axis itself being orientated horizontally and/or lying in the horizontal plane, although a horizontal orientation of the longitudinal axis is preferred.

A rotary position of the rotor blade or another component about its longitudinal axis is advantageously recorded in order to orientate the rotor blade towards the rotor hub in this respect. However, it may also be helpful, depending on the wind, to orientate the rotor blade in this respect such that as little surface area as possible is exposed to the wind.

The detection of the inclination of the longitudinal axis, particularly of the rotor blade, and the detection of the rotary position of the rotor blade or other components about its/their longitudinal axis may be detected using an inclination sensor, in particular what is known as an X-Y inclination sensor.

A satellite compass is advantageously used for the orientation in the horizontal plane. All three angles of the rotor blade or of another component can then be determined fundamentally, specifically inclination of the longitudinal axis, orientation of the longitudinal axis in the horizontal, and rotary position of the rotor blade or of the other component about the longitudinal axis.

A temperature detection by this transducer, which thus comprises at least one measuring means in the region of the rotor blade, in this case specifically a temperature sensor, may be of particular significance in wintry weather conditions around freezing point. Here, it may be that the temperature for example 100 meters above the ground differs from the temperature at ground level. Particularly in the vicinity of the freezing point, there may be a risk of an ice build-up, which would be indicated with less likelihood on the basis of the temperature conditions at ground level, or vice versa.

This situation is similar for the wind speed or wind strength in the region of the rotor blade, which at greater heights, for example in the range from 100 to 150 meters, may be completely different from that at ground level. Here, the wind speed in particular may be higher than at ground level. Accordingly, improved information concerning the ambient conditions in the region of the rotor blade can be provided by the transducer on the rotor blade.

The same is true for the measurement of a wind direction. This too at a high height may be different from at ground level. Here, the conditions in the region of the rotor blade, particularly when already raised approximately to hub height, are more significant than at ground level.

A further embodiment proposes recording at least some of the measurement data via a measuring sensor connected to the blade tip and/or the blade root. Such a measuring sensor may be a force sensor, in particular a tensile force sensor, which there detects a force or tensile force between the blade root and a guide rope or blade tip and another guide rope. In particular when the respective guide rope is connected at ground level to a winch and also can be held there with a specific tension, the force sensor or tensile sensor may record a corresponding tensile force between the blade root and guide rope or winch. A corresponding tensile force between the blade tip and guide rope or winch can be recorded in a similar manner. Movements of the rotor blade or another component can be detected as a result. However, a guidance of the rotor blade via such guide ropes can also be improved. In simplified terms, on the basis of an example, it is possible via such sensors on the guide ropes to better decide whether, in the case of a rotor blade with a steep inclination of the longitudinal axis, it is better to provide slack at the low-hanging point via the guide rope or to exert a tensile force at a higher-hanging point of the rotor blade via the guide rope secured there.

By means of such force transducers, which may also be referred to as measuring clips, forces in the guide ropes can thus be tracked. The monitoring of the installation thus can be improved.

The respective sensors, i.e., in particular a transducer fastened in the center of the blade and force transducers arranged on the guide ropes or in similar positions, preferably have unified output interfaces. By way of example, an output interface having a measurement signal output from 4 to 20 mA may be used. A further processing using known equipment thus can be facilitated. Additionally or alternatively, a radio transmission may be implemented, with standardized data protocols. On the one hand a universality thus can be achieved, and on the other hand a determination and evaluation at a number of locations, positions and/or pieces of equipment are possible at the same time. Both the crane operator and the manager on the ground can thus both obtain the same picture of the situation. At the same time, the data can be transmitted at least partially to control equipment, in particular such as winches for guiding the guide ropes. In the case of the use of a corresponding lifting traverse, this too may obtain direct measurement data and can influence a control system.

The measurement data or at least some of said data is preferably evaluated at a monitoring station, and the rotor blade is orientated on this basis.

Measurement values of a plurality of sensors arranged on the rotor blade are preferably guided to a common node point, in particular on a common radio transmission means. In particular, values of a satellite compass, which may also be referred to as a GPS compass, an X-Y inclination sensor and a height sensor, may be transmitted to such a common node, i.e., in particular radio transmission means, for example in a wired manner via a current signal standardized at 4 to 20 mA. The values of the tensile force sensors or force sensors may also be transmitted there, wherein a radio transmission may be implemented on account of a large distance from the sensors at the blade tip and blade root. A transducer arranged in the center of the blade, whether the geometric center or center of gravity, preferably has a radio transmission node of this type.

The further transmission is then implemented such that this recorded data is sent from the radio transmission node to a corresponding receiving node in a bundled manner. Such a receiving node is preferably arranged in a monitoring station stationed on the ground. There, the data can be evaluated and/or transmitted further, for example via WLAN, in order to transmit the data or some of said data to further equipment, in particular terminal equipment, such as laptops or even smartphones.

A preferred embodiment therefore also proposes fastening at least one guide rope to the blade root and the blade tip or to corresponding fastening points of other components and guiding said blade root and blade tip or other components downwardly to the ground and setting the inclination and/or orientation in the horizontal plane via at least one of these guide ropes on the basis of the transmitted and/or evaluated measurement data.

Position data of the rotor blade is preferably forwarded to winches in order to control the guide ropes. The winches preferably operate automatically on the basis of such position data. For this purpose the corresponding data may be evaluated at the winches or previously by a central evaluation unit. In particular, evaluations such as the calculation of differences between actual and desired position are considered. Data relating both to height and orientation of the rotor blade may lead to a corresponding actuation of the winches. Even the wind speed or wind direction can be used here in addition. By way of example, it is proposed that the winches each exert a greater force on the rotor blade in the event of stronger winds in order to fix the blade more strongly in the wind or at least to hold the blade still. With weaker wind, less tensile force can be used accordingly.

It is also advantageous when the position and/or orientation of the blade or other component is/are presented in graph form at a, or the, monitoring station and/or boundary conditions such as wind strength, wind direction and/or temperature are displayed. In particular the three angles of the blade orientation, specifically inclination of the longitudinal axis, orientation of the longitudinal axis in the horizontal plane, and rotary position of the rotor blade about the longitudinal axis can be presented in graph form accordingly. This facilitates on the one hand the monitoring and identification of the actual, current position and orientation of the blade. In addition, the communication may also be simplified, and in this case it is made possible to directly and quantitatively detect any readjustments.

Boundary conditions, such as temperature, wind direction and wind strength may be prepared and presented as numbers or also graphs. The wind direction in particular may be illustrated advantageously with reference to the orientation of the rotor blade in the horizontal plane, for example relative to the sought orientation of the longitudinal axis for the fastening of the blade.

The force recorded by the tensile force senses may be presented in each case as a number or graph, for example as a bar chart. The presentation as a bar chart or other similar presentation may be advantageous in particular for a comparison of the two forces, specifically at the blade root and the blade tip. In addition, the presentation can also be used for warnings by means of colors, for example an excessively high force or an excessively steep inclination can be emphasized by a red or different signal color.

The measurement data is therefore advantageously transmitted to the crane, the ground and/or a control facility, such as at least one winch for influencing the orientation. It is favorable when the crane and/or the least one winch changes/change the position and/or orientation automatically on the basis of the transmitted measurement data. Due to the proposed recording of measurement data, in particular using transducers and/or measuring means arranged directly on the rotor blade, data is now available that also permits reliable automation of the control system or part of the control system. An inclination or orientation in the horizontal plane by way of example may lead to corresponding actions of the rope winches that control the two guide ropes. The same is true for other orientations, such as the inclination of the blade. The rotor blade can also be lifted to the suitable height in an automated manner as a result.

These transducers and/or measuring means are preferably fastened detachably to the rotor blade or other component. An advantageous system for detecting the desired measurement data can thus be provided, which can be re-used for each blade due to the detachability. The fastening can be achieved by detachable adhesive bonding, screwing or via use of one or more suction cups. The detachment can be achieved with the aid of the crane, and additionally or alternatively can be performed by correspondingly automated detachment apparatuses.

An installation for installing a component, in particular a rotor blade, is also proposed. Such an installation arrangement comprises a crane for lifting and hoisting the rotor blade or another component, at least one transducer for recording measurement data relating to the position and/or orientation of the rotor blade, wherein the transducer is set up to transmit the measurement data to at least one monitoring station and/or control facility for controlling the position and/or orientation of the rotor blade. In particular, this installation arrangement is setup to carry out a method for installing a rotor blade according to at least one of the embodiments explained above. In this respect, reference is also made to the explanations of the individual embodiments of the above-described methods with regard to the explanations of the individual measuring means and evaluation units and transmission units.

The transducer preferably comprises at least one measuring means from the following list:
- a measuring means fastened to the rotor blade or other component and formed as an air pressure sensor for detecting a height position of the rotor blade or the other component,
- a measuring means fastened to the rotor blade or other component and formed as an inclination sensor for detecting an inclination of a longitudinal axis of the rotor blade or the other component,
- a measuring means fastened to the rotor blade or other component and formed as an inclination sensor for detecting a rotary position of the rotor blade about the longitudinal axis,
- a measuring means fastened to the rotor blade or other component and formed as a GPS receiver for detecting an orientation of the rotor blade in a horizontal plane,
- a measuring means, in particular a tensile force sensor, connected to the blade tip of the rotor blade or a first fastening point of another component, and
- a measuring means, in particular a tensile force sensor, connected to the blade root of the rotor blade or a second fastening point of another component.

In addition, an evaluation apparatus for evaluating, presenting and/or forwarding the measurement data to further presentation and/or control equipment is preferably provided. Due to this evaluation apparatus, which may constitute a central unit for the installation arrangement, the measurement data may be processed centrally and where necessary also displayed. A forwarding enables the consideration or direct use for control purposes. Here, it is also envisaged to forward only some of the information, and in particular it is envisaged specifically to forward to control facilities only the data that they require, or to already further process or evaluate the measurement data such that control units obtain direct control signals.

A radio transmission facility is preferably provided, which transmits measurement data from the rotor blade to a receiving facility, specifically by radio. A radio transmission that can also bundle the data to be transmitted is thus provided selectively. The data processing can be simplified as a result. The radio transmission thus comprises a sending facility and a receiving facility. The data to be transmitted, preferably from a plurality of sensors, is bundled in the sending facility and is transmitted jointly. Accordingly, the data is separated again and/or forwarded in the receiving facility.

The installation arrangement comprises a satellite-assisted locating and positioning display for displaying the location and/or position of the rotor blade or another component.

In addition, an apparatus for displaying the location and/or position of a rotor blade or another component is proposed. This comprises a sensor for recording a satellite-assisted location and/or position, wherein the sensor is set up to be fastened to a rotor blade or to another component, a display for displaying the location and/or position of the rotor blade or the other component, and a transmission means for transmitting data of a location and/or position recorded from the rotor blade or the other component to the display device.

A user may thus see the current location and/or position of the rotor blade or of the other component at the installation and may better control the installation.

This apparatus for displaying the location and/or position of a rotor blade or other component is also setup for use in a method for installing a rotor blade or other component and/or for use in an installation arrangement (1) for installing a rotor blade or other component in accordance with at least one of the above-described embodiments. The apparatus for displaying the location and/or position of a rotor blade or other component may also have one or more of the features that have been described in conjunction with at least one of the above-described embodiments for detecting, transmitting and/or processing position and/or location data.

BRIEF DESCRIPTION OF THE SEVERAL VIEWS OF THE DRAWINGS

The invention will now be described in greater detail hereinafter by way of example on the basis of an embodiment with reference to the accompanying drawings.

DETAILED DESCRIPTION

Figure 1:
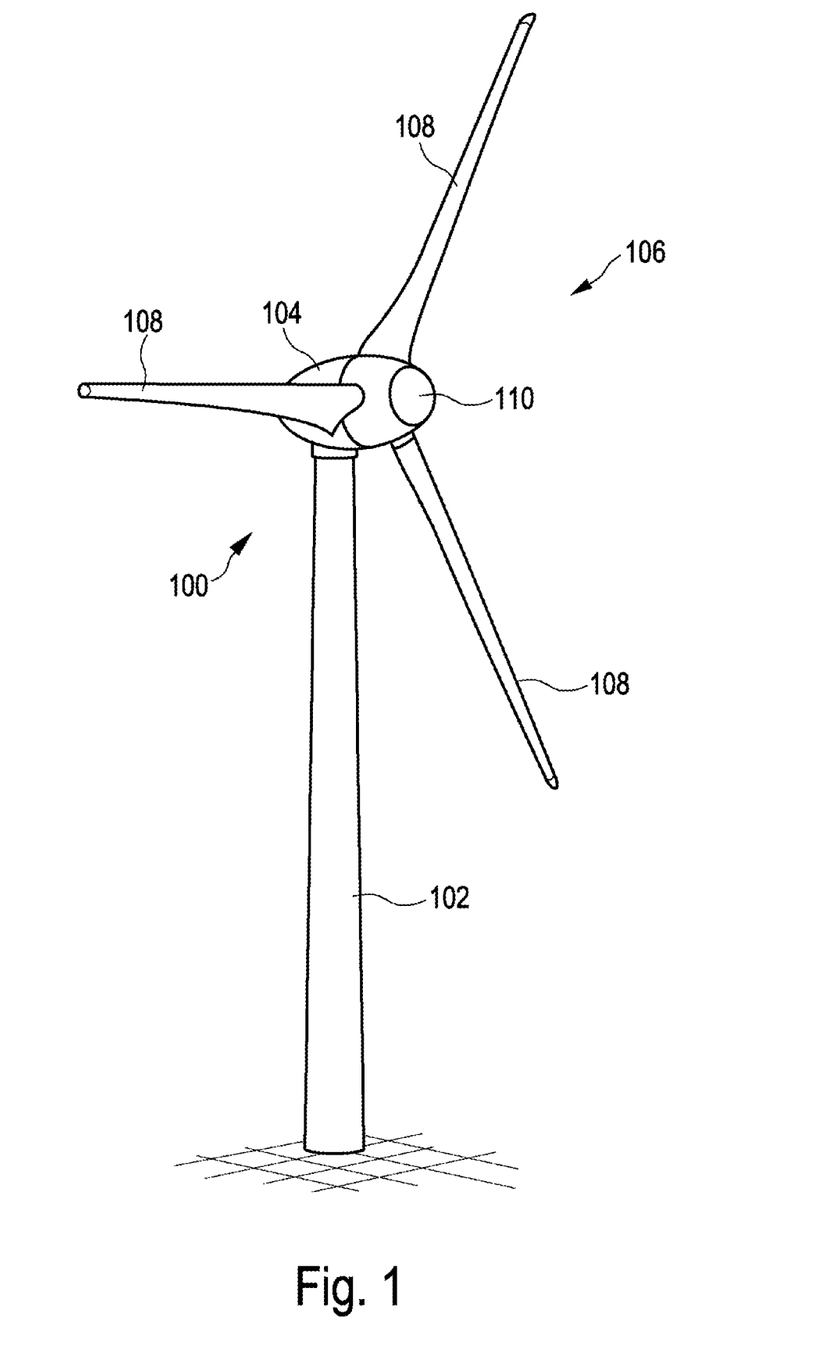
FIG. 1 shows a wind turbine in a perspective view.

FIG. 1 shows a wind turbine 100 having a tower 102 and a nacelle 104. A rotor 106 having three rotor blades 108 and a spinner 110 is arranged on the nacelle 104. The rotor 106 is set in rotation by the wind during operation and thus drives a generator in the nacelle 104.

Figure 2:
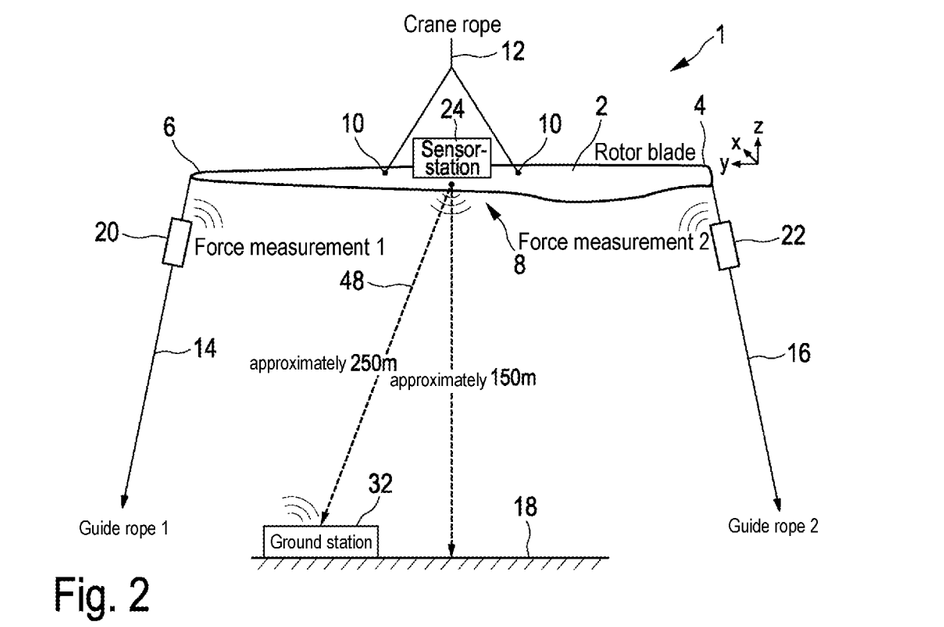
FIG. 2 shows a schematic illustration of an installation arrangement for installing a rotor blade.

FIG. 2 schematically shows an installation apparatus 1 and illustrates a rotor blade 2 already lifted for installation on a rotor hub. The rotor blade hangs substantially horizontally, which is generally the desired orientation, not only in the shown embodiment. Here, the rotor blade has a blade root 4 and a blade tip 6, however these are both illustrated here merely schematically. In a central region 8 of the rotor blade 2, the rotor blade 2 is suspended at two fastening points 10 and hangs substantially from a crane rope 12.

A first guide rope 14 is arranged at the blade tip 6, and a second guide rope 16 is arranged at the blade root 4 in order to be able to guide in particular the orientation of the rotor blade 2 from the ground 18.

Each guide rope 14 and 16 has a force sensor 20 and 22 respectively. A tensile force between the first or second guide rope 14, 16 and the blade tip or blade root 6, 4 respectively can be recorded via the first or second force sensor 20, 22 respectively.

Figure 3:
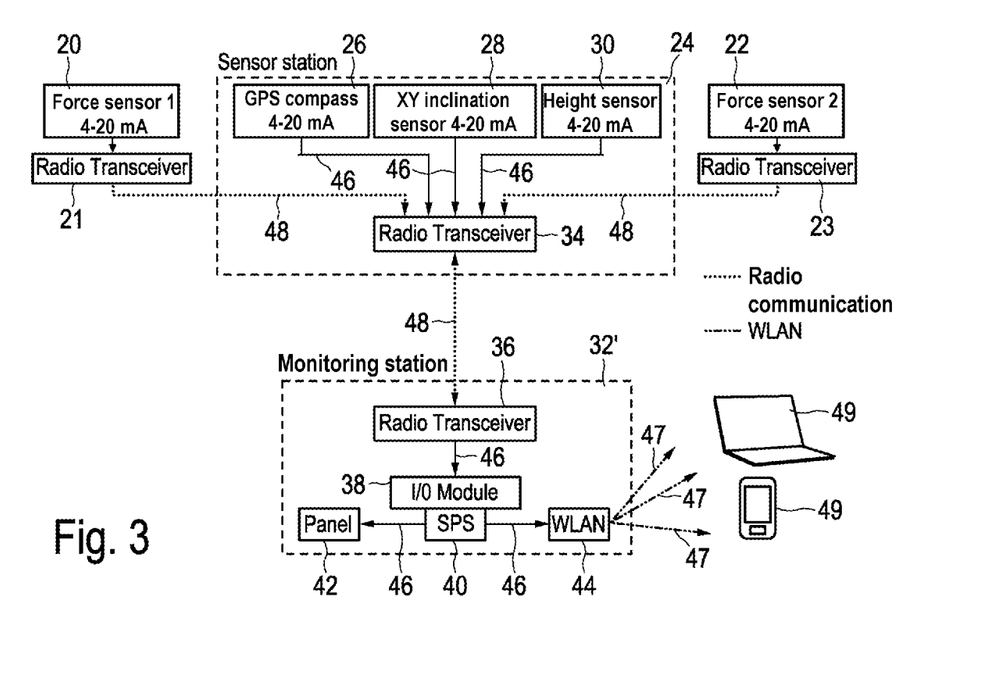
FIG. 3 shows a structure of used sensors of an installation arrangement together with a monitoring station and the communication therebetween.

A sensor station 24 is arranged in the central region 8 of the rotor blade 2 and here forms a transducer. As measuring means, the sensor station comprises a GPS compass 26, an X-Y inclination sensor 28, and a height sensor 30, as shown in the structure of FIG. 3.

The GPS compass 26 can detect the orientation of the rotor blade 2 in a horizontal plane, i.e., can detect the orientation with respect to the four compass directions in order to show this clearly.

The X-Y inclination sensor 28 can detect the inclination of the rotor blade or its longitudinal axis and can likewise detect a rotation or a small angle of rotation of the rotor blade about its longitudinal axis. From the viewpoint of the inclination sensor 28, these are two rotational coordinates that in particular are arranged at right angles to one another. Together with the GPS compass 26, the angle of orientation of the rotor blade thus can be detected with respect in particular to three Cartesian coordinates. This also illustrates, in the display 50 according to FIG. 4, the orientation symbol 52, which represents these three axes of inclination or rotation x, y and z.

The sensor station 24 additionally has the task of receiving values from the two force sensors 20 and 22. The two force sensors 20 and 22 for this purpose each have a radio transmitter 21 and 23 respectively. FIG. 3 illustrates the structure for this, and FIG. 2 illustrates the distance existing between the force sensors 20 and 22 and the sensor station 24.

The sensor station 24 then transmits its data further to a ground station 32, which is arranged on the ground 18. The rotor blade 2 and therefore the sensor station 24 may be located for example at a height of 150 meters above the ground 18.

FIG. 3 illustrates an internal structure of the sensor station, which also has a radio transmitter 34. The radio transmitter 34, which on account of its function can also be referred to as a collective radio transmitter, obtains wired signals, in any case in accordance with the embodiment of FIG. 3, from the GPS compass 26, the X-Y inclination sensor 28 and the height sensor 30. These three sensors may provide a plurality of data items to the radio transmitter 34, for example in each case via a signal in a range from 4 to 20 mA. The radio transmitters 21 and 23 in turn send their information to the radio transmitter 34. The radio transmitter 34 thus receives measurement data from five sensors, wherein at least the inclination sensor 28 sends data relating to two variables, specifically the inclination of the blade axis and the rotation of the rotor blade about the blade axis.

This data is thus received firstly in the radio transmitter 34 and where necessary is pre-processed, but in any case is transmitted via a further radio link to a monitoring station 32'. The monitoring station 32' may correspond to the ground station 32 according to FIG. 2.

The monitoring station 32', as shown in FIG. 3, in turn contains a radio transmitter 36, which can be referred to as a ground radio transmitter 36 and which primarily receives data transmitted by radio from the radio transmitter 34 of the sensor station 24. However, the ground radio transmitter 36 of the monitoring station 32' may also transmit signals back to the sensor station 24, such as fault signals, should there be any problems with the radio transmission, or other protocol data.

In the monitoring station 32' there is then a further transmission of the data in a wired manner to an input-output module 38, which can introduce a further processing and distribution of the data. The data or a selection of the data can be transmitted to a control panel 42 via an SPS module 40, specifically a module having a memory-programmable control system. In addition, the data or some of said data may be transmitted to a network module 44. The network module 44, in particular as a wireless network module, can construct a wireless network and transmit to further terminal equipment, such as a laptop, surface equipment or other equipment.

The structure according to FIG. 3 advantageously uses three transmission types, specifically a wired transmission 46, a transmission by WLAN 47 and a transmission by radio 48, i.e., wirelessly, but different from transmission via known WLAN technology. The transmission by WLAN 47 is used in particular for transmission to the terminal equipment 49 illustrated symbolically.

Figure 4:
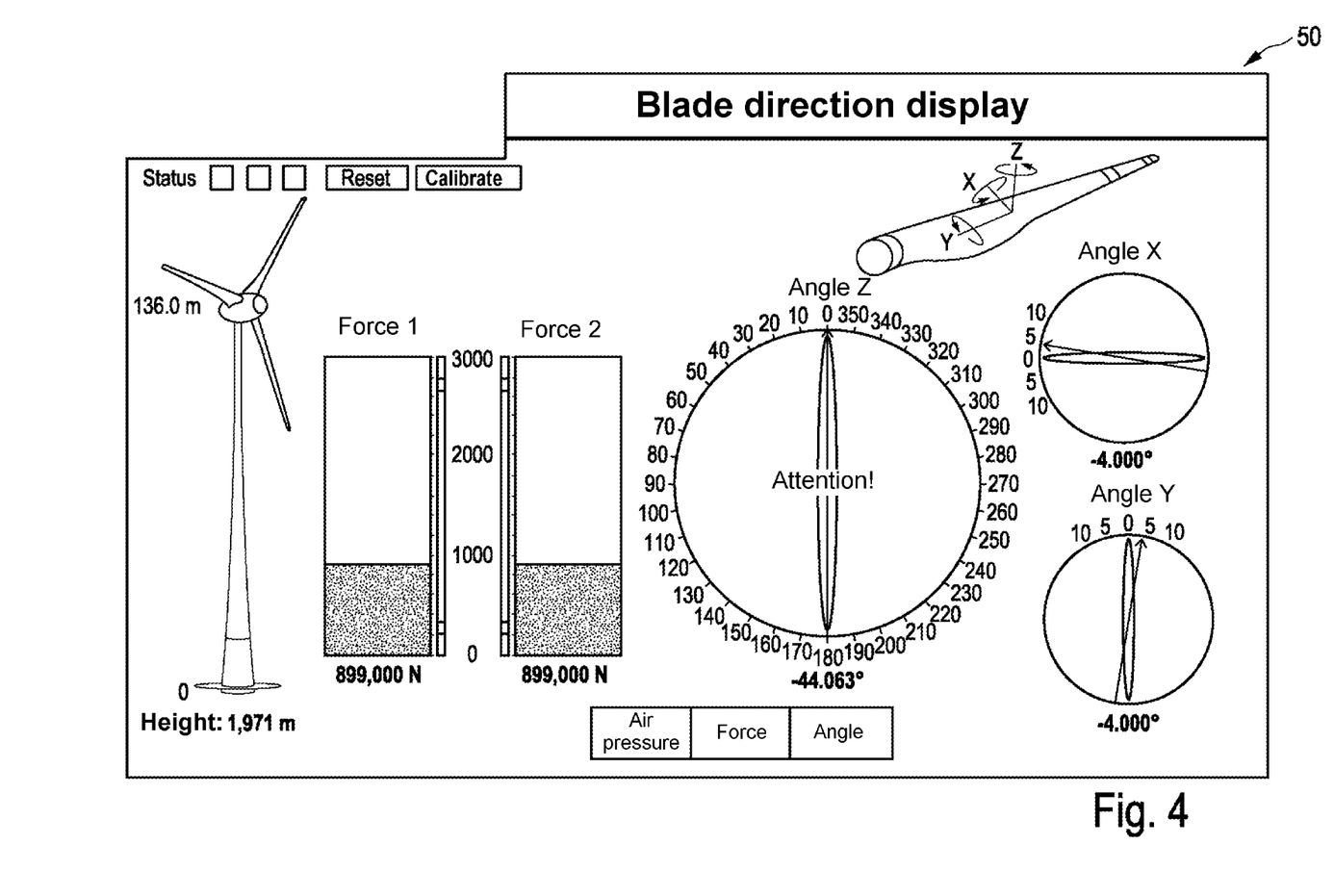
FIG. 4 shows a possible type of presentation of orientation and position of a rotor blade on the basis of evaluated measurement data.

The display 50 in FIG. 4, besides the orientation symbol 52, also shows a wind turbine symbol 54, which in particular shows the height to be reached, in this example 136 meters. Besides the wind turbine symbol 54, two bar charts 56 and 58, which illustrate the recorded force of the first and second force sensor 20, 22 according to 2, in both cases in the form of a bar, each also output a measurement value as a number.

A status display and next to this the possibility to calibrate the sensors, which is indicated by the calibration field 60, are located above the wind turbine symbol 54.

A calibration may be considered in particular for an air pressure sensor that incidentally also additionally can be received as a further measuring means in the sensor station 24 or can be connected thereto, in particular in order to compensate for weather-induced air pressure fluctuations. A calibration or a comparison may then be performed when the rotor blade has not yet been raised and is still located substantially on the ground. This calibration or comparison may also be performed with respect to the height position of the site of installation, or may be made necessary as a result thereof.

The specific values of the orientation of the three coordinates x, y and z are illustrated individually below the orientation symbol 52 by corresponding diagrams, which provide both an analogue and a digital presentation with accurate specification of the respective angle. These are the Z-angle display, which shows the orientation of the longitudinal axis in a horizontal plane, the X-angle display 64, which shows the inclination of the rotor blade or the inclination of the longitudinal axis of the rotor blade, and the Y-angle display 66, which shows an angle of rotation of the rotor blade about its own axis.

An assembly aid for the rotor blade mounting is thus proposed. It is thus possible to lift and to mount a rotor blade even with an obstructed view. A rotor blade location and position display is also available for this and is formed on the basis of measurement data.

All three angles of rotation of the rotor blade are thus determined using a satellite compass and an X-Y inclination sensor, specifically in particular all three possible Cartesian angles of rotation. The height, i.e., the vertical location of the rotor blade, is determined using an air pressure sensor. Forces in the guide ropes can be tracked by means of force transducers, which may also be referred to as measuring clips. The sensors that are connected in a wired manner to a radio transmitter 34 in the sensor station 24 can forward their information to this radio transmitter 34 or collective radio transmitter 34, for example via a measurement signal from 4 to 20 mA. In addition, the sensor station 24 for example may also contain an air pressure sensor. The values thereof can be used directly as air pressure values or can also be used to specify the height.

The force transducers 20 and 22 of the guide ropes 14 and 16 respectively send their values by means of radio transmission to the sensor station 24. From there, all measurement values, in the case of FIG. 3 the 6 measurement values or 6 measurement signals, are sent using a further radio transmitter to the ground station 32 or monitoring station 32'. There, the measurement values are evaluated in a memory-programmable control system and are displayed on a control panel.

The data is sent on from the ground station 32 or monitoring station 32' via WLAN and an FTP server, which is illustrated by the WLAN transmission module 47. It is then possible to display the same image as on the control panel 42 of the ground station 32 or the monitoring station 32', for example using a laptop or other WLAN-capable device, in particular using a normal Internet browser. Further ground staff can thus also follow the course of the installation process.

The invention claimed is:

1. A method comprising:
installing a component of a wind turbine on a wind turbine, wherein the component has a longitudinal axis, wherein installing comprises:
hoisting the component using a crane,
recording measurement data relating to a position, an air pressure, and an orientation of the component during the hoisting, wherein the measurement data relating to the air pressure is indicative of a height position of the component,
transmitting the measurement data to:
a monitoring station for monitoring the hoisting; and
a control facility for controlling at least one of the position and the orientation of the component; and
graphically illustrating at the monitoring station at least one of the position and the orientation of the component.

2. The method according to claim 1, wherein the component of the wind turbine is a rotor blade, and the rotor blade:
has a blade root for fastening the rotor blade to a hub;
a blade tip facing away from the blade root; and
the longitudinal axis extends from the blade root to the blade tip.

3. The method according to claim 1, wherein recording measurement data comprises recording measurement data using at least one measuring means that is arranged on the component or in a vicinity of the component and records measurement data relating to at least one of:
an inclination of the longitudinal axis,
an orientation of the longitudinal axis in a horizontal plane,
a rotary position of the component about the longitudinal axis,
a temperature,
wind speed or wind strength in a region of the measuring means, and
wind direction in the region of the measuring means.

4. The method according to claim 1, wherein at least some of the measurement data is recorded by at least one of the following:
a first measuring sensor connected to a front fastening point of the component, and
a second measuring sensor connected to a rear fastening point of the component.

5. The method according to claim 4, wherein the first and second measuring sensors are tensile sensors.

6. The method according to claim 1, further comprising evaluating the measurement data at the monitoring station and changing an orientation of the component based on the evaluation.

7. The method according to claim 1, wherein at least one guide rope is fastened to a front fastening point of the component and at least one guide rope is fastened to a rear fastening point of the component and are guided downwardly to a ground, and at least one of the inclination and orientation in the horizontal plane is set via at least one of these guide ropes based on the measurement data.

8. The method according to claim 1, further comprising transmitting the measurement data to a ground station and to the control facility, and using a winch for influencing the orientation of the component.

9. The method according to claim 1 further comprising displaying boundary conditions that include at least one of wind strength, wind direction and temperature.

10. The method according to claim 1, wherein the component is a rotor blade, wherein at least some of the measurement data is recorded by a first measuring sensor connected to a blade tip of the rotor blade and a second measuring sensor connected to a blade root of the rotor blade.

* * * * *